United States Patent
Kimura

(10) Patent No.: US 11,150,134 B2
(45) Date of Patent: Oct. 19, 2021

(54) SPECTRAL INFORMATION ACQUISITION SYSTEM, INSPECTION METHOD, AND MANUFACTURING METHOD

(71) Applicant: CANON KABUSHIKI KAISHA, Tokyo (JP)

(72) Inventor: Kazumi Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/136,438

(22) Filed: Dec. 29, 2020

(65) Prior Publication Data
US 2021/0207998 A1 Jul. 8, 2021

(30) Foreign Application Priority Data
Jan. 7, 2020 (JP) .............................. JP2020-000620

(51) Int. Cl.
*G01J 3/28* (2006.01)
*G01J 3/02* (2006.01)
*H04N 5/33* (2006.01)
*G01J 3/12* (2006.01)

(52) U.S. Cl.
CPC ........... *G01J 3/2823* (2013.01); *G01J 3/0224* (2013.01); *H04N 5/332* (2013.01); *G01J 2003/1208* (2013.01); *G01J 2003/2826* (2013.01)

(58) Field of Classification Search
CPC .... G01J 3/02; G01J 3/18; G01J 3/2803; G01J 3/2823; G01J 3/28
USPC .......................................................... 356/328
See application file for complete search history.

(56) References Cited

U.S. PATENT DOCUMENTS

2011/0164221 A1* 7/2011 Tilleman .............. G02B 27/283
353/20

FOREIGN PATENT DOCUMENTS

| JP | H06317534 A | 11/1994 |
| JP | H11295239 A | 10/1999 |
| JP | 2005337785 A | 12/2005 |

\* cited by examiner

*Primary Examiner* — Md M Rahman
(74) *Attorney, Agent, or Firm* — Rossi, Kimms & McDowell LLP

(57) ABSTRACT

The spectral information acquisition system includes an illumination optical system configured to illuminate an object being moved and a spectral optical system configured to disperse light from the object illuminated by the illumination optical system. The illumination optical system includes a separation element configured to separate a light flux emitted from a light source into a first polarized light flux having a first polarization state and a second polarized light flux having a second polarization state, and a phase plate configured to change the polarization state of at least one of the first polarized light flux and the second polarized light flux. The first polarized light flux illuminates the object from a first direction, and the second polarized light flux illuminates the object from a second direction that is different from the first direction.

17 Claims, 7 Drawing Sheets

SPECTRAL INFORMATION ACQUISITION SYSTEM, INSPECTION METHOD, AND MANUFACTURING METHOD

BACKGROUND OF THE INVENTION

Field of the Invention

The present invention relates to a spectral information acquisition system including an illumination optical system and a spectral optical system.

Description of the Related Art

There has hitherto been proposed a spectral information acquisition system as a hyperspectral camera configured to read spectral image data of an inspected object.

Further, as an illumination optical system which can be used for such a spectral information acquisition system, in Japanese Patent Application Laid-Open No. H11-295239, there is disclosed an illumination optical system capable of illuminating a long area on an inspected object with a polarized illumination light flux obtained by allowing a light flux emitted from a linear light source to pass through a polarizing plate.

However, in the illumination optical system disclosed in Japanese Patent Application Laid-Open No. H11-295239, when the light flux emitted from the light source passes through the polarizing plate, a component in a direction perpendicular to a polarizing axis is blocked, with the result that utilization efficiency of the light flux emitted from the light source becomes ½.

SUMMARY OF THE INVENTION

In view of the above, the present invention has an object to provide a spectral information acquisition system capable of achieving sufficient light utilization efficiency.

According to the present invention, there is provided a spectral information acquisition system including: an illumination optical system configured to illuminate an object being moved; and a spectral optical system configured to disperse light from the object illuminated by the illumination optical system, wherein the illumination optical system includes: a separation element configured to separate a light flux emitted from a light source into a first polarized light flux having a first polarization state and a second polarized light flux having a second polarization state; and a phase plate configured to change the polarization state of at least one of the first polarized light flux and the second polarized light flux, and wherein the first polarized light flux illuminates the object from a first direction, and the second polarized light flux illuminates the object from a second direction that is different from the first direction.

Further features of the present invention will become apparent from the following description of exemplary embodiments with reference to the attached drawings.

DESCRIPTION OF THE EMBODIMENTS

Now, a spectral information acquisition system according to each embodiment is described with reference to the drawings. The figures may be drawn in scales different from the actual scale in some cases for the sake of convenience. Further, in each of the figures, the same members are denoted by the same reference symbols, and redundant description thereof is omitted.

As mentioned above, in the illumination optical system of the related art using the polarizing plate, when the light flux emitted from the light source passes through the polarizing plate, the component in the direction perpendicular to the polarizing axis is blocked, with the result that the utilization efficiency of the light flux emitted from the light source becomes ½.

Further, when energy of the blocked component is absorbed by the polarizing plate, the polarizing plate generates heat. As a result, for example, when the illumination optical system is used for a spectral information acquisition system of an inspection apparatus for food, the generated heat may deteriorate food.

In view of the above, in the spectral information acquisition system according to the embodiment, the illumination optical system described below is used, thereby being capable of achieving sufficient light utilization efficiency and suppressing generation of heat.

First Embodiment

First, with reference to FIG. 1 to FIG. 4, a spectral image reading system (spectral information acquisition system) 100 according to a first embodiment is described.

Figure 1:
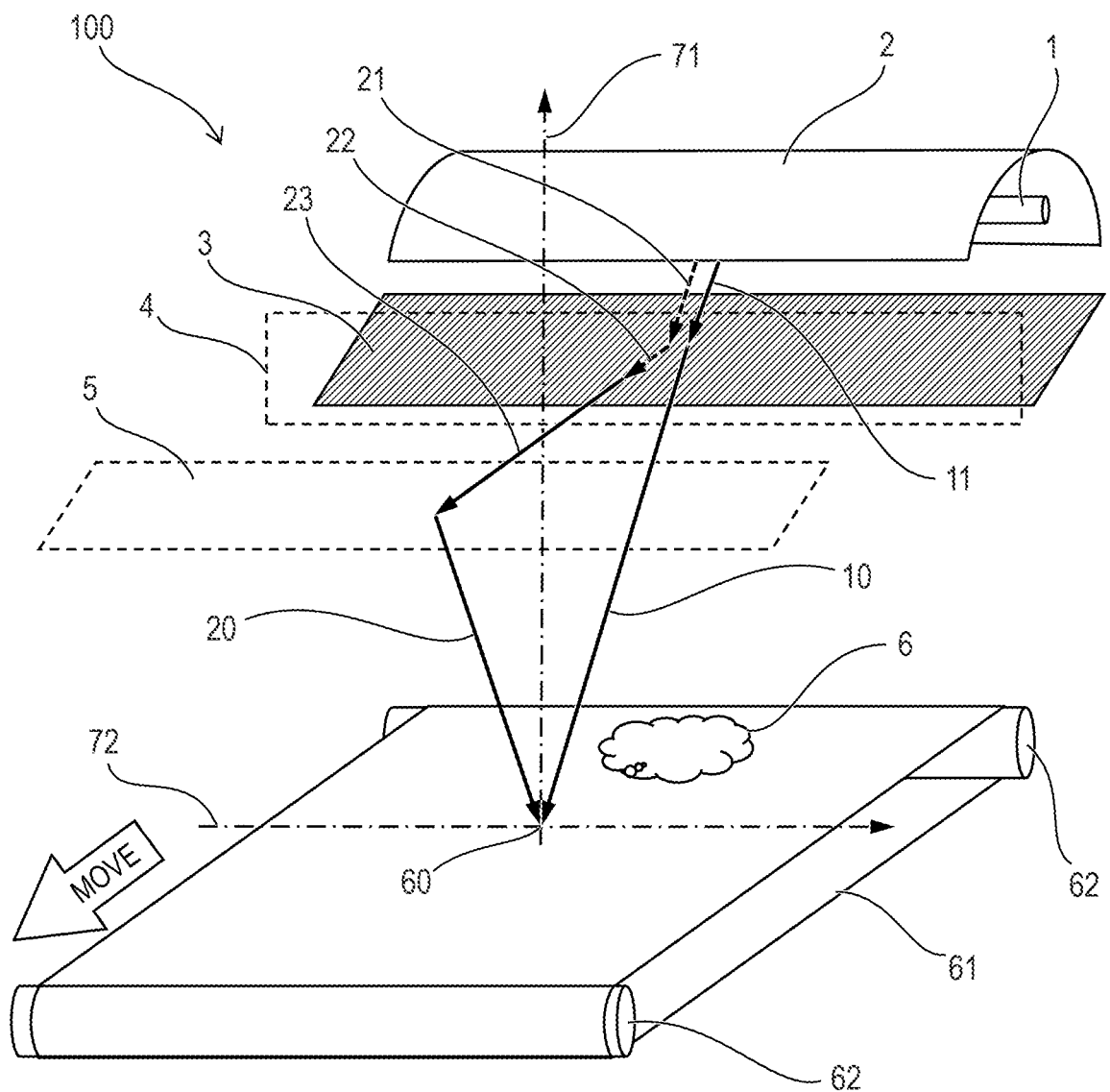
FIG. 1 is a perspective view for illustrating a spectral image reading system according to a first embodiment.
Figure 2:
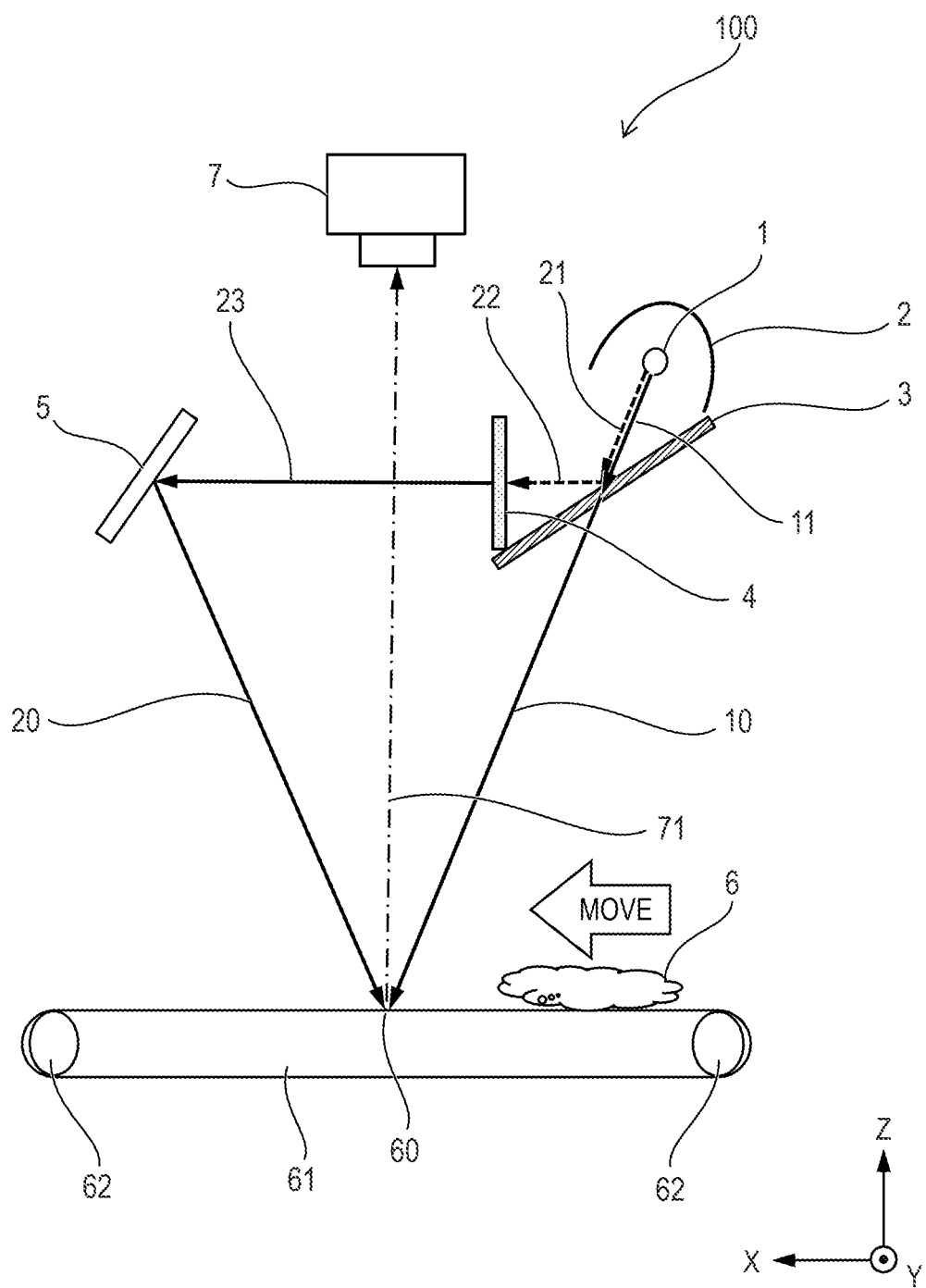
FIG. 2 is an explanatory sectional view for illustrating an illumination optical system of the spectral image reading system according to the first embodiment.

Specifically, FIG. 1 is a perspective view for illustrating the spectral image reading system 100 according to this embodiment. FIG. 2 is an explanatory XZ sectional view for illustrating an illumination optical system of the spectral image reading system 100 according to this embodiment.

Figure 3:
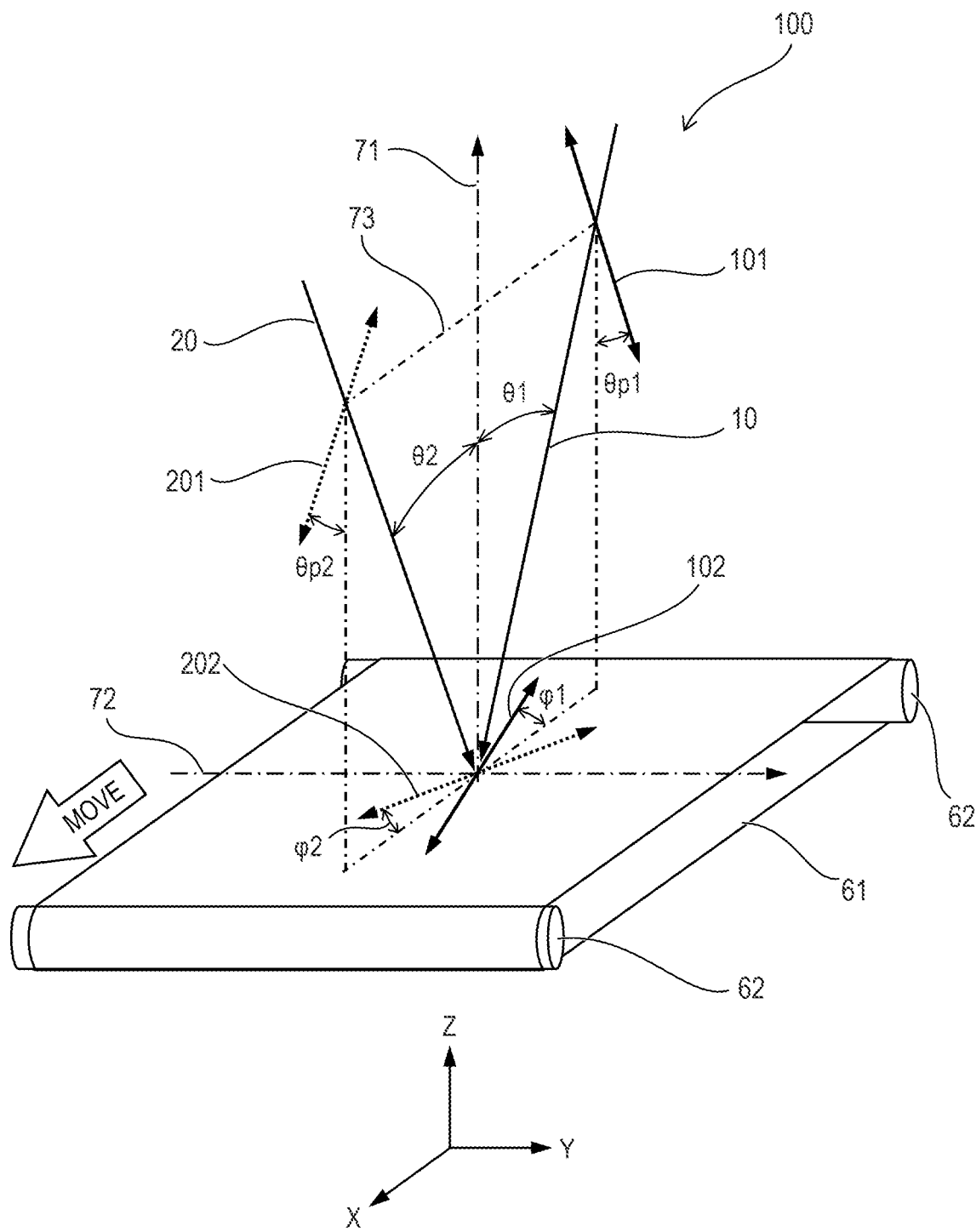
FIG. 3 is an explanatory perspective view for illustrating a polarization state in the spectral image reading system according to the first embodiment.
Figure 4:
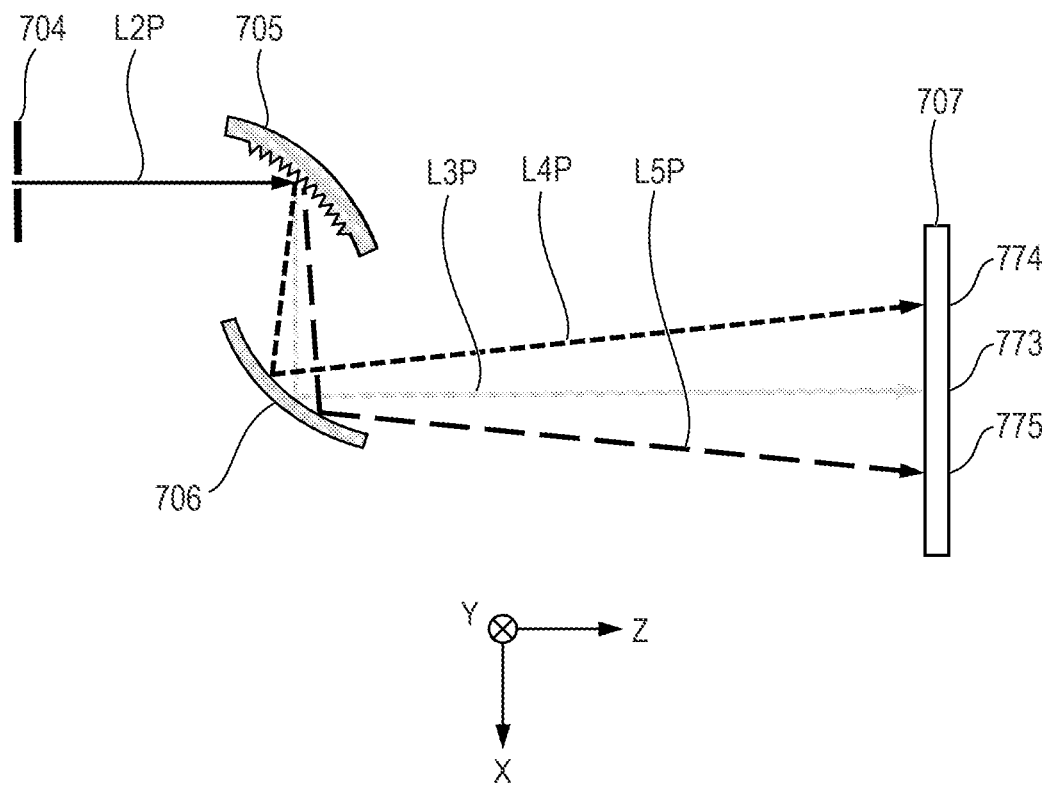
FIG. 4 is an explanatory sectional view for illustrating a spectral image reading optical system of the spectral image reading system according to the first embodiment.

FIG. 3 is an explanatory perspective view for illustrating a polarization state of the illumination optical system of the spectral image reading system 100 according to this embodiment. FIG. 4 is an explanatory XZ sectional view for illustrating a spectral image reading optical system 7 of the spectral image reading system 100 according to this embodiment.

In the drawings, illustration is given of a light source 1, a light collecting element (reflector) 2, a polarization separation element (separation element) 3, a phase plate (λ/2 plate) 4, an optical-path changing element (mirror) 5, an inspected object 6, and the spectral image reading optical system (hyperspectral camera or spectral optical system) 7.

Further, in the drawings, illustration is given of a first polarized light flux 10, a second polarized light flux 20, and an optical axis 71 of the spectral image reading optical system 7.

Now, description is made of the elements provided to the spectral image reading system 100 according to this embodiment.

The light source 1 is a long light source including a light emitting portion having a linear shape such as a rod shape. It is preferred that the light source 1 have such a length that the inspected object 6 can be sufficiently illuminated. Further, it is preferred that the light source 1 be configured to emit a light flux having a plurality of wavelength bands covering short wavelengths to long wavelengths as in a case of, for example, a halogen lamp.

Further, in the spectral image reading system 100 according to this embodiment, the reflector 2 serving as a light collecting element is provided in such a manner as to surround the light source 1.

The reflector 2 has a columnar shape with a quadratic curve, such as a parabolic column shape or an elliptical column shape. In particular, when the reflector 2 has the elliptical column shape having focal points around the light source 1 and the inspected object 6, respectively, higher light collection efficiency can be achieved.

A condensing lens can also be used as the light collecting element in place of the reflector 2.

The polarization separation element 3 is configured to separate incident non-polarized light fluxes 11 and 21 into the two light fluxes 10 and 22 being different types of polarized light and emit the light fluxes 10 and 22 in different directions.

In the spectral image reading system 100 according to this embodiment, a polarizing filter of a wire-grid type (wire-grid polarizing element or WG-PF) is used as the polarization separation element 3. The WG-PF is produced by sandwiching a wire-grid surface, which is a thin layer of aluminum wire mesh, from both sides with two glass plates (or synthetic silica glass plates).

Further, fine wires forming the wire-grid surface are arranged at intervals of from 100 nm to 1,000 nm, and the intervals can be set according to a wavelength of an illumination light flux to be used.

A structural birefringent action on the wire-grid surface of the aluminum wire mesh causes the incident non-polarized light fluxes to separate into a light flux being P-polarized light and a light flux being S-polarized light.

In FIG. 2, the separated light flux 10 is the P-polarized light having an oscillation plane in a direction parallel to the drawing sheet, and the separated light flux 22 is the S-polarized light having an oscillation plane in a direction perpendicular to the drawing sheet.

As the polarization separation element 3, in place of the WG-PF, a polarizing beam splitter (PBS) including two prisms (or two parallel flat plates) and a polarization separation film, which is provided between the two prisms and is formed of a dielectric multilayer film, may be used.

As the phase plate 4, a λ/2 plate configured to give a phase difference of 180° to the incident polarized light fluxes is used. As a material of the phase plate 4, a birefringent optical material is used. For example, there has been known a birefringent optical material obtained by processing a quartz crystal into a thin plate shape.

In the spectral image reading system 100 according to this embodiment, an optic axis of the phase plate 4 is set to 45° with respect to a polarization direction (phase angle, polarizing angle, or oscillation direction) of the light flux 22 so that the light flux 22 being the S-polarized light can be converted into a light flux 23 being the P-polarized light.

The mirror 5 is an optical-path changing element configured to bend a traveling direction of the light flux 23 toward the inspected object 6. The mirror 5 can easily be handled when the mirror 5 has high reflectivity for a wavelength band to be used and has a small difference in reflectivity characteristics with respect to the P-polarized light and the S-polarized light.

The inspected object 6 is an inspected piece to be subjected to determination of characteristics. As illustrated in FIG. 1 to FIG. 3, the inspected object 6 is placed on an upper surface of a conveyance belt 61 and moves together with the conveyance belt 61.

A roller 62 is provided at least at one end portion of the conveyance belt 61. The roller 62 is driven to rotate by a driving motor (not shown). The conveyance belt 61 moves in conformity with the rotation of the roller 62.

The spectral image reading optical system 7 is a hyperspectral camera. In particular, in the spectral image reading system 100 according to this embodiment, a push-broom hyperspectral camera is used.

In order to acquire image information of the inspected object 6, reflected light that is reflected from the inspected object 6 and travels along the optical axis 71 of the spectral image reading optical system 7 is imaged (dispersed) by the spectral image reading optical system 7.

As illustrated in FIG. 2, the first polarized light flux 10 and the second polarized light flux 20 illuminate the inspected object 6 from a first direction and a second direction, respectively, across the optical axis 71 of the spectral image reading optical system 7.

In other words, in a cross section (second cross section) parallel to the moving direction of the inspected object 6 and to the optical axis 71 of the spectral image reading optical system 7, respective optical paths of the first polarized light flux 10 and the second polarized light flux 20 given at the time of being incident on the inspected object 6 are located on opposite sides across the optical axis 71 of the spectral image reading optical system 7.

Here, the image information of the inspected object 6 that can be read by the spectral image reading system 100 according to this embodiment includes spatial information, which corresponds to shape information of the inspected object 6, and spectral information in a predetermined wavelength band.

The spectral image reading optical system 7 includes a light receiving sensor 707 (light receiving element) having a two-dimensional arrangement. An image of the spatial information along a reading line 72 (reading direction) is formed in a first arrangement direction (Y direction), and the spectral information is collected in a second arrangement direction (X direction) orthogonal to the first arrangement direction.

Then, a controller (not shown) reads out the image information from the light receiving sensor 707 at predetermined timings.

Next, a configuration of the hyperspectral camera serving as the spectral image reading optical system 7 is described.

FIG. 4 shows optical paths of light beams dispersed by the spectral image reading optical system 7.

In FIG. 4, illustration is given of a slit 704, a first reflection/diffraction surface 705, an anamorphic second reflection surface 706, and the light receiving sensor (image surface) 707.

Further, on a front side of the slit 704, a front (imaging) optical system (front group) (not shown) configured to form an image of a desired area of the inspected object 6 on the slit 704 at least in a dispersing direction is provided.

The first reflection/diffraction surface 705 has a free-form surface shape as a base shape, and a diffraction grating having a pitch in a range of from a submicron order to a micron order and a grating height in a range of from a submicron order to a micron order is formed on a surface thereof.

The diffraction grating may have a sectional shape such as a step shape, a rectangular shape, a blaze shape, or a sine wave shape, and the sectional shape is selected in view of diffraction efficiency and ease of manufacture.

The diffraction grating having the sectional shape of the blaze shape is relatively easy to achieve both the ease of manufacture and improvement in diffraction efficiency.

Further, when the diffracted light to be used is set to be primary, the height of the diffraction grating can be set lower, and hence manufacture can easily be carried out.

The second reflection surface 706 is a reflection surface having a free-form surface shape with reflection coating applied on an optical surface.

Here, the free-form surface shape of the second reflection surface 706 is an aspherical surface shape expressed by known expressions.

The slit 704 has an elongated opening portion having a width of approximately from several micrometers to 100 micrometers in a direction perpendicular to the drawing sheet of FIG. 4, and an area other than the opening portion is configured to prevent passage of at least a light beam having a wavelength band based on design specification.

As the light receiving sensor 707, an image sensor such as a CCD or a CMOS is used. Depending on the wavelength band based on the design specification, the light receiving sensor 707 using a material such as InGaAs or InAsSb is adopted.

In this case, it is preferred that the number of pixels of the light receiving sensor 707 be determined in consideration of a resolution in the dispersing direction. Further, the light receiving sensor 707 has a light-receiving area in which light receiving pixels are arranged in a two-dimensional pattern.

With the light receiving pixels arranged in the dispersing direction (second arrangement direction or X direction), the light beams (for example, L3P, L4P, and L5P of FIG. 4) are collected as the spectral information.

Further, with the light receiving pixels arranged in the spatial direction (first arrangement direction or Y direction) perpendicular to the dispersing direction, an image of the spatial information on the reading line 72 illustrated in FIG. 1 is formed.

Next, actions of the spectral image reading system 100 according to this embodiment are described.

First, actions of the illumination optical system are described. In the spectral image reading system 100 according to this embodiment, the illumination optical system is configured to illuminate an elongated illumination area on the inspected object 6 along the reading line 72 (Y direction) orthogonal to the moving direction (X direction) of the conveyance belt 61.

Specifically, an illumination light flux from the light source 1 is emitted by the reflector 2 having an elliptical shape as convergent light fluxes (denoted by reference symbols 11 and 21 in FIG. 1) in the non-polarization state.

Then, the convergent light fluxes 11 and 21 in the non-polarization state enter the polarization separation element 3. The polarization separation element 3 allows the P-polarized light having the polarization direction parallel to the XZ cross section (second cross section) to pass therethrough and reflects the S-polarized light having the polarization direction perpendicular to the XZ cross section.

With this, the convergent light fluxes 11 and 21 in the non-polarization state are separated into polarized light beams, specifically, the light flux 10 being the P-polarized light and the light flux 22 being the S-polarized light, and are emitted in different directions.

Then, the light flux 10 emitted by the polarization separation element 3 as linear polarized light having the polarization direction parallel to the XZ cross section, that is, the P-polarized light travels as the first polarized light flux 10 to a reading point 60 on the conveyance belt 61.

Meanwhile, the light flux 22 emitted by the polarization separation element 3 as the S-polarized light having the polarization direction perpendicular to the XZ cross section enters the phase plate 4 provided on the optical path.

The optic axis of the phase plate 4 is provided in the direction of 45° with respect to the XZ cross section. Therefore, the linear polarized light of the incident light flux 22 perpendicular to the XZ cross section is converted into the linear polarized light parallel to the XZ cross section and emitted as the light flux 23.

Then, the optical path of the light flux 23 is bent by the mirror 5 serving as the optical-path changing element, and the light flux 23 travels as the second polarized light flux 20 being the linear polarized light having the polarization direction parallel to the XZ cross section, that is, the P-polarized light to the reading point 60 on the conveyance belt 61.

After reaching the reading point 60, the first polarized light flux 10 having a first polarization state and the second polarized light flux 20 having a second polarization state illuminate the inspected object 6 from the first direction and the second direction, respectively, which are different from each other.

Further, as described above, both the first polarized light flux 10 and the second polarized light flux 20 reach the reading point 60 as the linear polarized light having the polarization direction parallel to the XZ cross section.

In the related-art spectral image reading system, the polarizing plate is used in place of the polarization separation element 3 to generate the linear polarized light. Therefore, light energy corresponding to the second polarized light flux 20 is absorbed by the polarizing plate and is thus lost.

Meanwhile, in the spectral image reading system 100 according to this embodiment, with the use of the polarization separation element 3, the second polarized light flux 20 in addition to the first polarized light flux 10 is also used as the illumination light flux having the same linear polarized light.

With this, in the spectral image reading system 100 according to this embodiment, a light utilization rate can be doubled as compared to the related-art spectral image reading system.

Further, in the spectral image reading system 100 according to this embodiment, with the use of the polarization separation element 3, the light energy corresponding to the second polarized light flux 20 is not absorbed. Therefore, generation of heat can also be suppressed.

In addition, the first polarized light flux 10 and the second polarized light flux 20 are both the light flux emitted from the common, that is, single light source 1.

Further, in the spectral image reading system 100 according to this embodiment, with the use of the reflector 2 having the elliptical column shape as the light collecting element, elongated illumination along the reading line 72 can be performed.

Then, as the inspected object 6 placed on the conveyance belt 61 is conveyed to the area subjected to the elongated illumination as described above, polarization illumination is performed in the long area on the inspected object 6.

Next, actions of the spectral image reading optical system 7 are described.

The spectral image reading optical system 7 provided to the spectral image reading system 100 according to this embodiment includes the front group, a light shielding member, and a rear group which are arranged in the stated order from an object side toward an image side.

Specifically, the reflected light reflected by the illuminated inspected object 6 is once condensed by the front optical system (front group) (not shown) and then passes through the opening portion of the slit 704 (light shielding member).

At this time, in the YZ cross section (third cross section) parallel to the Y direction, an image of the inspected object 6 is not formed on the opening portion of the slit 704. Meanwhile, in the XZ cross section perpendicular to the Y direction, an intermediate image of the inspected object 6 is formed on the opening portion of the slit 704.

In the spectral image reading system 100 according to this embodiment, the first reflection/diffraction surface 705 (diffraction surface) and the second reflection surface 706 allow an image of the image information (that is, spatial information and spectral information) to be formed on the light receiving sensor 707.

Here, the first reflection/diffraction surface 705 and the second reflection surface 706 are collectively referred to as a spectral optical element (rear group).

That is, as illustrated in FIG. 4, a light flux L2P having passed through the slit 704 is incident on the first reflection/diffraction surface 705.

Then, the first reflection/diffraction surface 705 having the diffraction grating arranged thereon disperses and reflects the incident light flux L2P in the XZ cross section.

Thus, the light flux L2P being incident on the first reflection/diffraction surface 705 is subjected to a dispersing action only in the dispersing direction and is not subjected to a dispersing action in the reading direction for the spatial information (that is, reading line 72).

Then, the light beams having been dispersed and reflected by the first reflection/diffraction surface 705 are further reflected and collected by the second reflection surface 706 to enter the light receiving sensor 707 provided at an image surface position.

In FIG. 4, the light beams L3P, L4P, and L5P having optical paths corresponding to different wavelengths are illustrated as examples.

After formation of an image in the vicinity of the opening portion of the slit 704 with the front optical system (not shown), the light flux L2P having passed through the slit 704 travels to the first reflection/diffraction surface 705.

The shape of the diffraction grating on the first reflection/diffraction surface 705 is determined so as to utilize primary diffracted light.

Therefore, the light beams corresponding to respective wavelengths included in the light flux L2P are caused to strongly show the primary diffracted light by the first reflection/diffraction surface 705 and are dispersed and reflected as the light beams including L3P, L4P, and L5P.

Then, the light beams dispersed and reflected by the first reflection/diffraction surface 705 are further subjected to a collecting action by the second reflection surface 706, and thus images of the light beams L3P, L4P, and L5P are formed at image formation points 773, 774, and 775 on the light receiving sensor 707, respectively.

Thus, the plurality of light beams having different wavelengths are collected at different positions on the light receiving surface of the light receiving sensor 707 in the XZ cross section.

With this, the spectral image reading optical system 7 is capable of forming a plurality of images corresponding to respective wavelengths on the light receiving surface of the light receiving sensor 707, that is, acquiring a plurality of image information pieces corresponding to respective wavelengths.

In such a manner, the spectral image reading optical system 7 takes in the light fluxes from the linear reading range extending along the reading line 72 on the inspected object 6 and then disperses and collects the light fluxes.

Accordingly, the line-shaped (one-dimensional) image information along the first arrangement direction (Y direction), that is, the spatial information is read on the light receiving sensor 707 having the two-dimensional arrangement, and the spectral information having the image information pieces arranged for respective wavelengths along the second arrangement direction (X direction) can be read.

In the spectral image reading system 100 according to this embodiment, the controller (not shown) causes the inspected object 6 to move in the X direction and controls the light receiving sensor 707 to sequentially read such one-dimensional spatial information pieces and spectral information pieces in time division.

Then, the controller (not shown) executes arithmetic processing on the one-dimensional spatial information pieces and spectral information pieces acquired at respective timings, thereby being capable of acquiring two-dimensional spatial information pieces in the XY plane at predetermined wavelengths, that is, a two-dimensional overall image of the inspected object 6 and differences in wavelengths in the predetermined one-dimensional spatial information pieces (that is, spectral distribution).

As mentioned above, the inspected object 6 is conveyed by the conveyance belt 61, and the spatial information pieces on the reading line 72 orthogonal to the moving direction of the inspected object 6 can be read with use of the light receiving pixels in the first arrangement direction on the light receiving sensor 707.

Further, through the above-mentioned reading operation in time division, the image information of the entire inspected object 6 can be acquired.

Description has been given of the mode in which the spectral image reading optical system 7 illustrated in FIG. 4 includes the front optical system (imaging optical system) (not shown) and a spectral optical system consisting of the two reflection surfaces. However, the spectral image reading optical system 7 is not limited to this mode, and various modes can be adopted.

As illustrated in FIG. 2, the inspected object 6 is illuminated with the first polarized light flux 10 and the second polarized light flux 20 from the first direction and the second direction, respectively, across the optical axis 71.

The inspected object 6 illuminated from the two directions in such a manner generates shape information and reflected light having characteristic spectral wavelengths according to a material forming the inspected object 6.

The spectral image reading system 100 according to this embodiment reads the reflected light generated in such a manner from the optical axis 71.

The spectral image reading system 100 according to this embodiment adopts such an arrangement that regular reflected light of each of the first polarized light flux 10 and the second polarized light flux 20 from the conveyance belt 61 is prevented from traveling to the spectral image reading optical system 7.

Therefore, flare is less liable to be caused by the conveyance belt 61. The conveyance belt 61 may have various shapes. However, the conveyance belt 61 that is mirror-finished so as to prevent adhesion of a residual object of the inspected object 6 to the conveyance belt 61 may have the problem of flare.

Further, in the spectral image reading system 100 according to this embodiment adopting the arrangement described above, influence of gloss that occurs depending on a surface state of the inspected object 6 can be reduced.

The gloss is a regular reflection component on the surface of the inspected object 6 and has high intensity. In the case of detecting characteristics of the material in the composition of the inspected object 6 in relation to spectral reflection, the gloss may become a noise factor.

Therefore, the configuration of the spectral image reading system 100 according to this embodiment is effective also for reduction of noise caused by the gloss.

Next, with reference to FIG. 3, description is made of conditional expressions for allowing the first polarized light flux 10 and the second polarized light flux 20 to have the same polarization direction.

In FIG. 3, illustration is given of an incident plane (first cross section) 73 including the first direction in which the first polarized light flux 10 travels, the second direction in which the second polarized light flux 20 travels, and the optical axis 71 of the spectral image reading optical system 7.

$\theta 1$ represents an angle of the first direction in which the first polarized light flux 10 travels as measured from the optical axis 71 of the spectral image reading optical system 7.

The polarization direction of the first polarized light flux 10 is denoted by reference symbol 101. $\theta p1$ represents an angle formed between the polarization direction 101 of the first polarized light flux 10 and the incident plane 73.

$\varphi 1$ represents an angle formed between a polarization direction 102 of the first polarized light flux 10 projected on the conveyance belt 61 and the incident plane 73.

$\theta 2$ represents an angle of the second direction in which the second polarized light flux 20 travels as measured from the optical axis 71 of the spectral image reading optical system 7.

The polarization direction of the second polarized light flux 20 is denoted by reference symbol 201. $\theta p2$ represents an angle formed between the polarization direction 201 of the second polarized light flux 20 and the incident plane 73.

$\varphi 2$ represents an angle formed between a polarization direction 202 of the second polarized light flux 20 projected on the conveyance belt 61 and the incident plane 73.

In the spectral image reading system 100 according to this embodiment, when Expressions (1), (2), and (3) with the parameters defined above are satisfied, the first polarized light flux 10 and the second polarized light flux 20 can have the same polarization direction.

$$|\varphi 1 - \varphi 2| \leq 10° \quad (1)$$

$$\varphi 1 = a\tan(\tan\theta p1/\cos\theta 1) \quad (2)$$

$$\varphi 2 = a\tan(\tan\theta p2/\cos\theta 2) \quad (3)$$

Here, when the upper limit value of Expression (1) is exceeded, the difference in the polarization direction between the first polarized light flux 10 and the second polarized light flux 20 which illuminate the inspected object 6 becomes excessively larger. As a result, the detection accuracy is degraded.

Specifically, in the spectral image reading system 100 according to this embodiment, $\theta 1 = 25°$ and $\theta 2 = 25°$ are given.

In this case, when the first polarized light flux 10 is generated by passage of the P-polarized light through the polarization separation element 3 having an installation tolerance of ±2°, a maximum value of $\theta p1$ becomes +2°, and $\varphi 1$ becomes +2.21°.

Further, when the second polarized light flux 20 is generated by reflection of the S-polarized light on the polarization separation element 3 having the installation tolerance of ±2°, the light flux 22 having a tolerance of +2° as a maximum value in the polarization direction is subjected to rotation of the polarized light in the phase plate 4. As a result, $\theta p2 = -2°$ is given, and $\varphi 2 = -2.21°$ is given.

Therefore, in the spectral image reading system 100 according to this embodiment, regarding Expression (1), $|\varphi 1 - \varphi 2| = 4.42° \leq 10°$ is satisfied.

In the description above, $\theta 1 = \theta 2$ is given. However, in the case of preventing the regular reflected light of one polarized light flux by the inspected object 6 from traveling on the optical path of another polarized light flux, it is conceivable to adopt $\theta 1 \neq \theta 2$.

In the spectral image reading system 100 according to this embodiment, with the configuration described above, the loss of the illumination light flux radiated from the light source 1 is reduced, thereby being capable of obtaining the polarized illumination light that is increased in intensity.

Further, a polarization illumination optical system for reading a spectral image, which is reduced in generation of heat and reduced in size and cost of the apparatus, and a spectral image reading system using the polarization illumination optical system can be provided.

Second Embodiment

Figure 5:
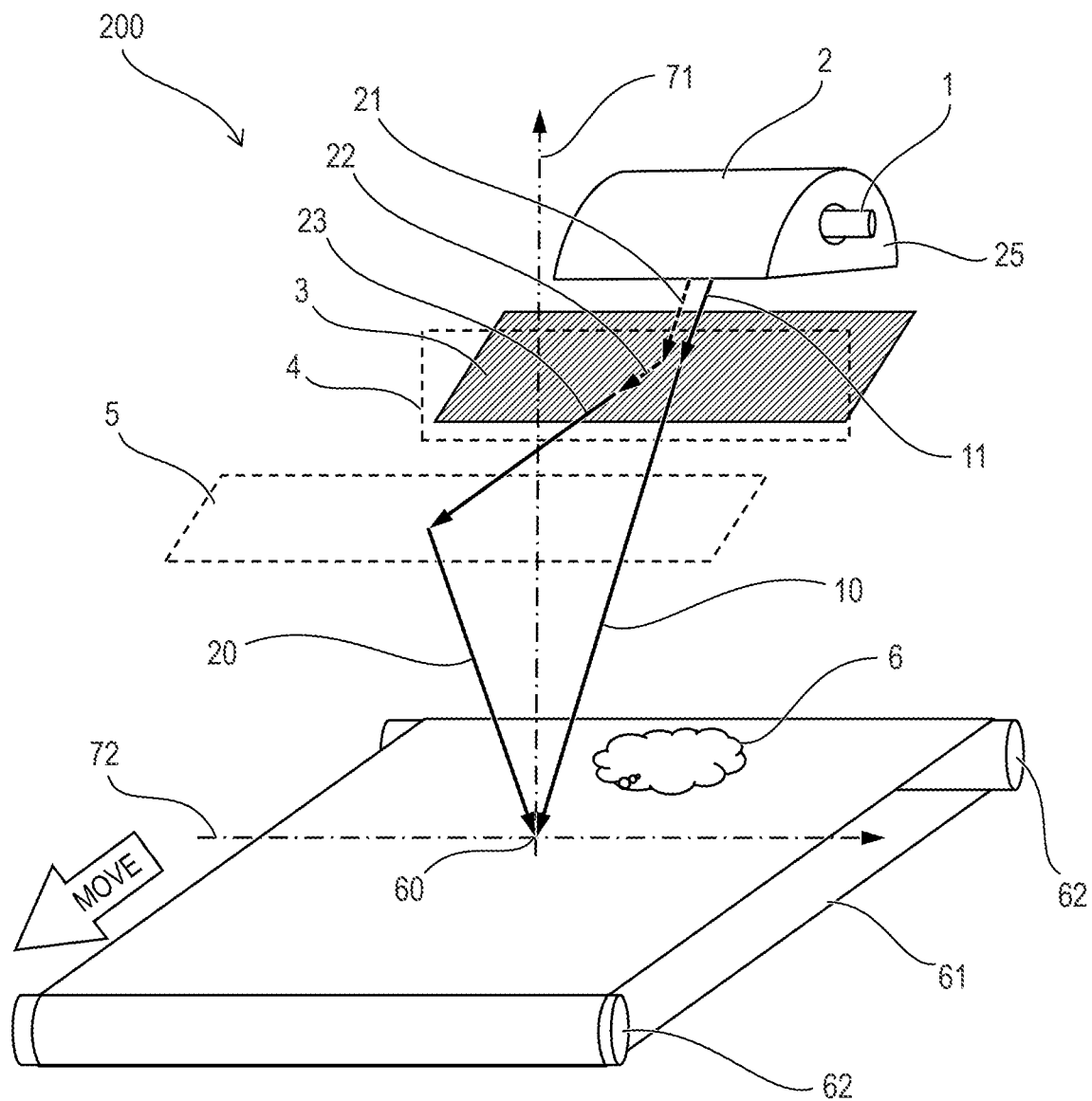
FIG. 5 is a perspective view for illustrating a spectral image reading system according to a second embodiment.

FIG. 5 is a perspective view for illustrating a spectral image reading system 200 according to a second embodiment. The spectral image reading system 200 according to the second embodiment has the same configuration as the spectral image reading system 100 according to the first embodiment except that side reflectors 25 are additionally provided. Therefore, the same members are denoted by the same reference symbols, and redundant description thereof is omitted.

As illustrated in FIG. 5, as compared to the spectral image reading system 100 according to the first embodiment, the spectral image reading system 200 according to this embodiment is shorter and more compact in respective dimensions of the light source 1, the reflector 2, the polarization separation element 3, the phase plate 4, and the mirror 5 along the reading line 72.

Such configuration can be achieved by providing the side reflectors 25. That is, as illustrated in FIG. 5, the side reflectors 25 are provided on both sides of the reflector 2 having the elliptical column shape.

With this, in the spectral image reading system 200 according to this embodiment, mirror images of the light source 1 and the reflector 2 are formed, thereby being capable of obtaining substantially the same illumination effect as the spectral image reading system 100 according to the first embodiment including the elements which are long along the reading line 72.

As described above, in the spectral image reading system 200 according to this embodiment, the polarization separation element 3, the phase plate 4, and the mirror 5 can be reduced in size, thereby being capable of obtaining a compact and low-cost apparatus.

Thus, in the spectral image reading system 200 according to this embodiment, with the configuration described above, the loss of the illumination light flux radiated from the light source 1 is reduced, thereby being capable of obtaining the polarized illumination light that is increased in intensity.

Further, a polarization illumination optical system for reading a spectral image, which is reduced in generation of heat and reduced in size and cost of the apparatus, and a spectral image reading system using the polarization illumination optical system can be provided.

Third Embodiment

Figure 6:
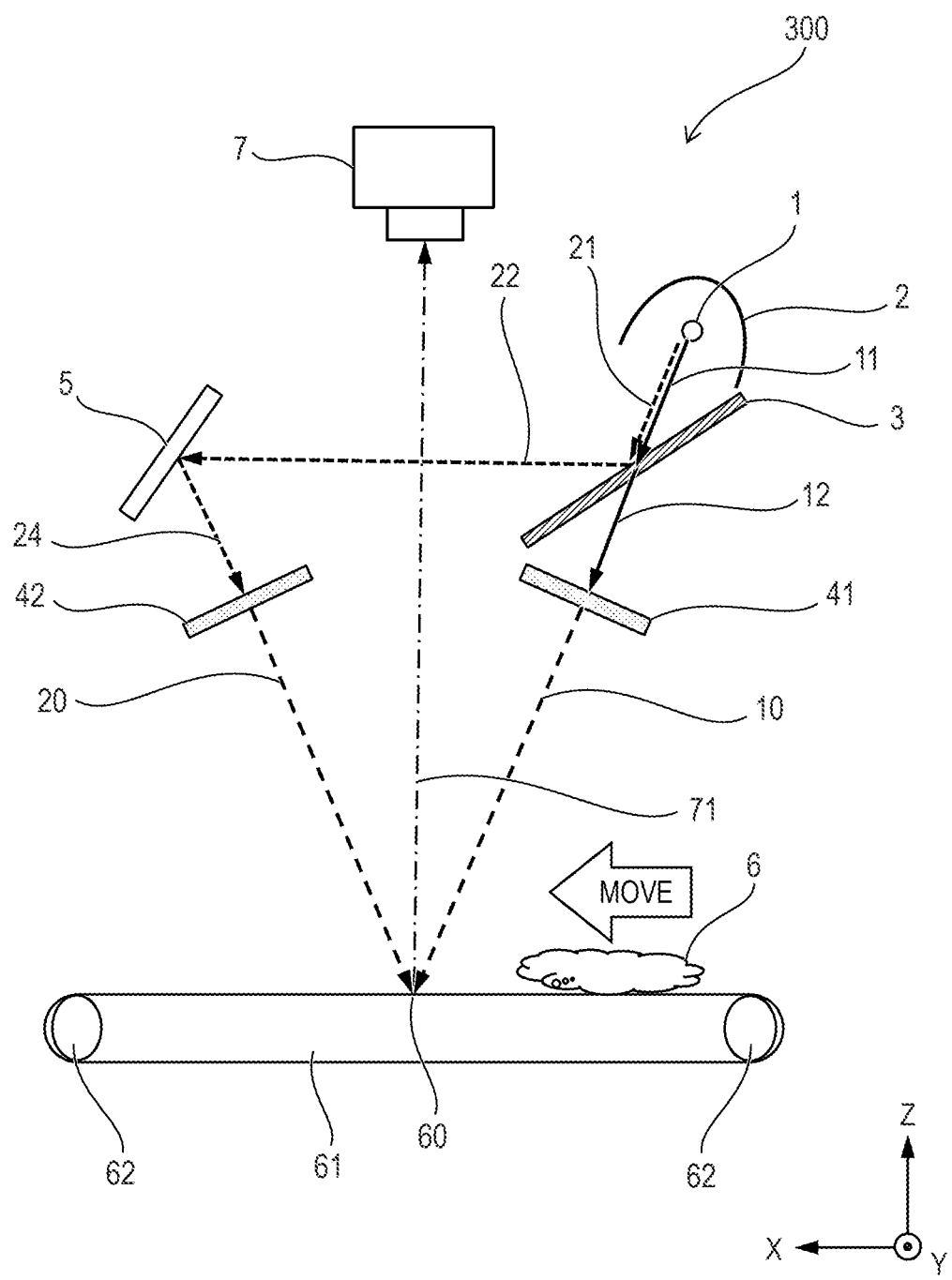
FIG. 6 is an explanatory sectional view for illustrating an illumination optical system of a spectral image reading system according to a third embodiment.

FIG. 6 is an explanatory XZ sectional view for illustrating an illumination optical system of a spectral image reading system 300 according to a third embodiment. The spectral image reading system 300 according to the third embodiment has the same configuration as the spectral image reading system 100 according to the first embodiment except that phase plates 41 and 42 are provided in place of the phase plate 4. Therefore, the same members are denoted by the same reference symbols, and redundant description thereof is omitted.

As illustrated in FIG. 6, in the spectral image reading system 300 according to this embodiment, as compared to the spectral image reading system 100 according to the first embodiment, the phase plates 41 and 42 are provided on optical paths of the first polarized light flux 10 and the second polarized light flux 20, respectively, in place of the phase plate 4.

Now, actions of the illumination optical system of the spectral image reading system 300 according to this embodiment are described.

In the spectral image reading system 300 according to this embodiment, the illumination optical system is configured to illuminate an elongated area along the reading line 72 (Y direction) orthogonal to the moving direction of the inspected object 6 (X direction) moved by the conveyance belt 61.

Specifically, the illumination light flux from the light source 1 is converted into a convergent light flux and emitted via the reflector 2 having the elliptical shape.

The convergent light fluxes thus emitted are in the non-polarization state and are illustrated as, for example, light fluxes 11 and 12 in FIG. 6.

Then, the convergent light fluxes 11 and 21 in the non-polarization state enter the polarization separation element 3. The polarization separation element 3 performs a polarizing separation by allowing the P-polarized light having the polarization direction parallel to the drawing sheet to pass and reflecting the S-polarized light having the polarization direction perpendicular to the drawing sheet, and emits the P-polarized light and the S-polarized light in different directions.

Then, the light flux 10 that is emitted by the polarization separation element 3 as the linear polarized light having the polarization direction parallel to the drawing sheet travels as the first polarized light flux 10 to the reading point 60.

At this time, on the optical path of the first polarized light flux 10 between the polarization separation element 3 and the reading point 60, the phase plate (λ/2 plate) 41 is provided under a state in which an optic axis thereof is inclined in a direction of forming an angle θp1/2 with respect to the drawing sheet.

Then, the first polarized light flux 10 passes through the phase plate 41, and the polarization direction is converted so that the first polarized light flux 10 is formed into the linear polarized light having a predetermined polarization direction forming an angle θp1 with respect to the drawing sheet. After the conversion, the first polarized light flux 10 travels to the reading point 60.

Further, the light flux 22 that is emitted by the polarization separation element 3 as the linear polarized light having the polarization direction perpendicular to the drawing sheet is reflected by the mirror 5 as the light flux 24 and then enters the phase plate 42 provided on the optical path of the light flux 24 between the mirror 5 and the reading point 60.

Here, the phase plate 42 is provided under a state in which the optic axis thereof is inclined in a direction of forming an angle 45°±θp1/2 with respect to the drawing sheet.

Then, the light flux 24 passes through the phase plate 42, and the polarization direction is converted so that the light flux 24 is formed into the linear polarized light having a predetermined polarization direction forming an angle θp1 with respect to the drawing sheet. After the conversion, the light flux 24 travels as the second polarized light flux 20 to the reading point 60.

As described above, the first polarized light flux 10 and the second polarized light flux 20 which have reached the reading point 60 illuminate the inspected object 6 from the first direction and the second direction, respectively, which are different from each other.

Further, as described above, both the first polarized light flux 10 and the second polarized light flux 20 reach the reading point 60 as the linear polarized light having the predetermined polarization direction forming the angle θp1 with respect to the drawing sheet.

In the related-art spectral image reading system, the light energy corresponding to the second polarized light flux 20 is absorbed by the polarizing plate.

Meanwhile, in the spectral image reading system 300 according to this embodiment, with the use of the polarization separation element 3, the second polarized light flux 20 is also used as the polarized illumination light flux having the same polarization direction as the first polarized light flux 10, and hence the light utilization rate can be doubled.

Further, in the spectral image reading system 300 according to this embodiment, with the use of the polarization separation element 3, the light energy corresponding to the second polarized light flux 20 is not absorbed. Therefore, generation of heat can also be suppressed.

With this, in the spectral image reading system 300 according to this embodiment, with the configuration described above, the loss of the illumination light flux radiated from the light source 1 is reduced, thereby being capable of obtaining the polarized illumination light that is increased in intensity.

Further, a polarization illumination optical system for reading a spectral image, which is reduced in generation of heat and reduced in size and cost of the apparatus, and a spectral image reading system using the polarization illumination optical system can be provided.

Fourth Embodiment

Figure 7:
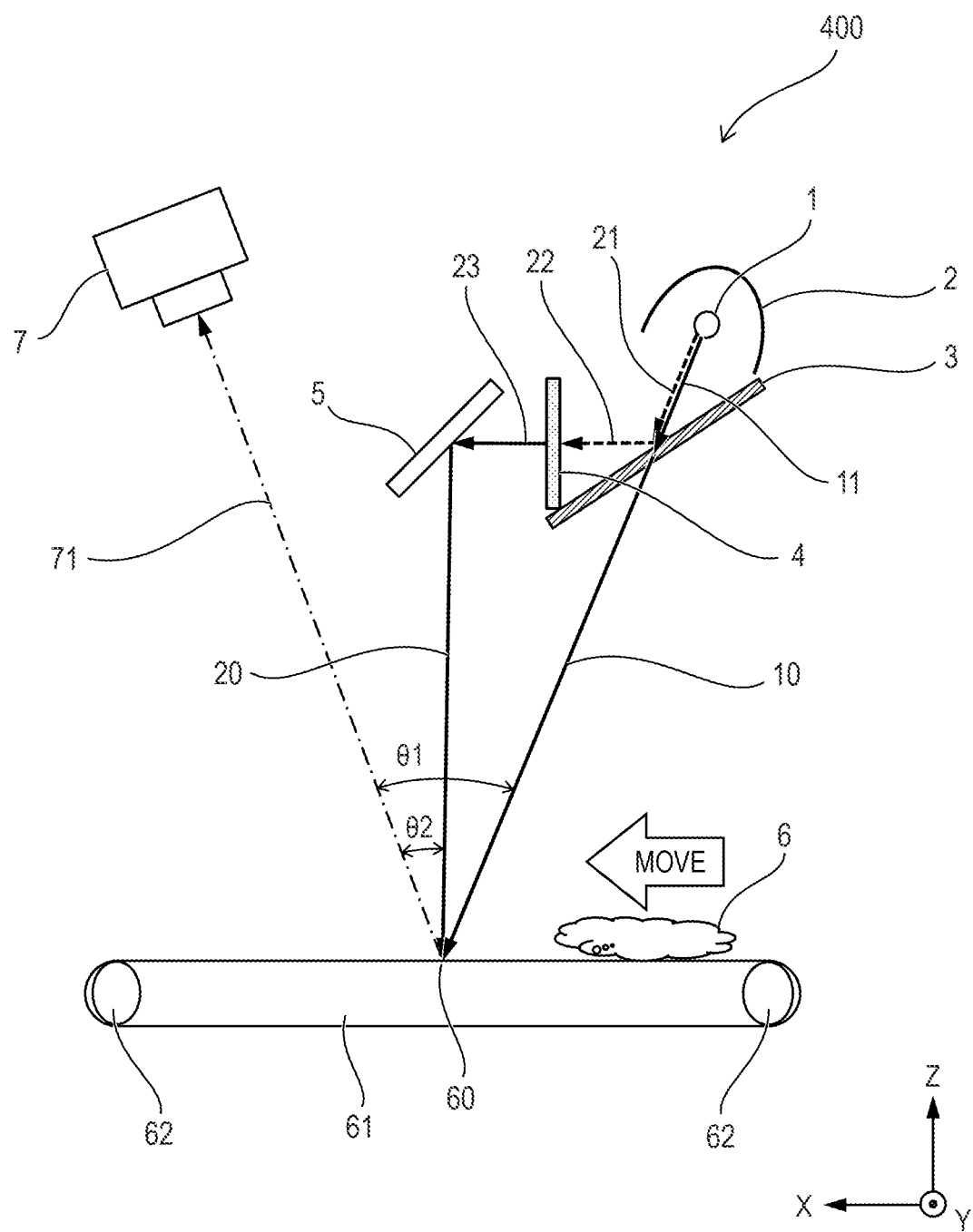
FIG. 7 is an explanatory sectional view for illustrating an illumination optical system of a spectral image reading system according to a fourth embodiment.

FIG. 7 is an explanatory XZ sectional view for illustrating an illumination optical system of a spectral image reading system 400 according to a fourth embodiment. The spectral image reading system 400 according to the fourth embodiment has the same configuration as the spectral image reading system 100 according to the first embodiment except that the relative arrangement of the optical elements is changed. Therefore, the same members are denoted by the same reference symbols, and redundant description thereof is omitted.

As illustrated in FIG. 7, in the spectral image reading system 400 according to this embodiment, as compared to the spectral image reading system 100 according to the first embodiment, the second polarized light flux 20 is incident on the inspected object 6 from the direction perpendicular to the conveyance belt 61, that is, from the direction directly above the conveyance belt 61.

In the spectral image reading system 400 according to this embodiment, the spectral image reading optical system 7 is provided at a position obliquely above the inspected object 6.

In other words, in the spectral image reading system 400 according to this embodiment, in a cross section parallel to the moving direction of the inspected object 6 and to the optical axis 71 of the spectral image reading optical system 7, respective optical paths of the first polarized light flux 10 and the second polarized light flux 20 given at the time of being incident on the inspected object 6 are located on the same side with respect to the optical axis 71 of the spectral image reading optical system 7.

Here, θ1 and θ2 represent angles formed by respective incident directions of the first polarized light flux 10 and the second polarized light flux 20 on the inspected object 6 with respect to the optical axis 71 of the spectral image reading optical system 7.

In this case, in the spectral image reading system 400 according to this embodiment, the optical elements are arranged in such a manner as to satisfy θ1=2×θ2.

Further, in other words, in the spectral image reading system 400 according to this embodiment, the first direction is located within a plane including a normal line of a placement surface of the conveyance belt 61 on which the inspected object 6 is placed and the optical axis 71 of the spectral image reading optical system 7 and is located on the side opposite to the optical axis 71 of the spectral image reading optical system 7 across the normal line of the placement surface.

Further, the spectral image reading system 400 satisfies:

θ4=θ3; and

θ5≠θ3, where θ3 represents an angle formed between the normal line of the placement surface and the optical axis 71 of the spectral image reading optical system 7, θ4 represents an angle formed between the first direction and the normal line of the placement surface, and θ5 represents an angle formed between the second direction and the normal line of the placement surface.

With this, in the spectral image reading system 400 according to this embodiment, the spectral image reading optical system 7 mainly reads the regular reflected light component of the first polarized light flux 10 illuminating the inspected object 6 and the diffused reflected light component of the second polarized light flux 20 illuminating the inspected object 6.

Thus, with the spectral image reading system 400 according to this embodiment, the illumination efficiency for the case of inspecting the inspected object 6 with small surface reflection and small gloss is improved, thereby enabling high-speed determination.

In the spectral image reading system 400 according to this embodiment, with the configuration described above, the polarized illumination light that is reduced in loss of the illumination light flux radiated from the light source can be obtained.

Further, a polarization illumination optical system for reading a spectral image, which is reduced in generation of heat and reduced in size and cost of the apparatus, and a spectral image reading system using the polarization illumination optical system can be provided.

Next, description is made of a use example of the spectral image reading system according to any one of the first to fourth embodiments described above.

The spectral image reading system according to any one of the first to fourth embodiments described above is capable of reading a line-shaped inspected area at once and picking up an image of the line-shaped inspected area having been read as line images corresponding to wavelengths divided along the dispersing direction.

With this, tone information of the image along the reading direction can be read.

Specifically, a light receiving surface of an image pickup element being the light receiving sensor 707 having the two-dimensional arrangement is arranged. Then, the inspected object 6 placed on the conveyance belt 61 is conveyed along the moving direction (X direction) so that the line-shaped inspected area on the inspected object 6 sequentially passes through the reading line 72.

Then, the spectral image reading optical system 7 sequentially reads the line-shaped inspected area of the inspected object 6 passing through the reading line 72 in time division.

With this, the light receiving sensor 707 is capable of acquiring an image of a one-dimensional inspected area of the inspected object 6 dispersed according to the wavelengths, that is, the spectral information in the dispersing direction of the inspected object 6 and the one-dimensional spatial information in the direction of the reading line 72.

Then, for example, the images being one-dimensional spatial information pieces corresponding to specified wavelengths are arranged by the controller (not shown), thereby being capable of acquiring two-dimensional images of the inspected object 6 corresponding to specified wavelengths.

Alternatively, the spectral distribution can be acquired based on the tone information corresponding to wavelengths in the specified area of the inspected object 6.

The exemplary embodiments have been described above, but the present invention is not limited to those embodiments and can be modified and changed variously within the scope of the gist thereof.

[Inspection Method and Manufacturing Method]

Now, description is made of an inspection method for an object (inspected object) using the spectral image reading system according to any one of the first to fourth embodiments and a manufacturing method for an item.

The spectral image reading system according to any one of the first to fourth embodiments is suitable for inspection (evaluation) in industrial fields such as a manufacturing industry, agriculture, and medical services.

In a first step (image pickup step) in the inspection method according to this embodiment, an image of an object is picked up through use of the spectral image reading system according to any one of the first to fourth embodiments to acquire image information of the object.

At this time, as mentioned above, the image information of the entire object can be acquired by picking up an image of the object while changing a relative position between the object and an image pickup apparatus. Further, image information pieces of a plurality of objects can be sequentially (successively) acquired.

In the first step, a plurality of image information pieces corresponding to respective wavelengths of a plurality of light fluxes emitted from the spectral image reading system according to any one of the first to fourth embodiments may be acquired.

In the next second step (inspection step), the object is inspected based on the image information acquired in the first step.

At this time, for example, a user (inspector) may perform a process of checking (determining) presence or absence of foreign matter or flaws in the image information or a process of detecting foreign matter or flaws in the image information with use of the controller (image processor) and notifying a user of the detection result.

Alternatively, a controller configured to control a manufacturing apparatus for an item described later depending on a determination result regarding the presence or absence of foreign matter or flaws may be adopted.

Further, in the second step, the inspection for the object may be performed based on the spectral distribution of the object acquired through use of the plurality of image information pieces corresponding to the wavelengths.

Through use of the image information pieces acquired via the spectral image reading system according to any one of the first to fourth embodiments, the characteristic spectral information of the object subjected to the inspection can be acquired, thereby being capable of specifying components of the object.

For example, image information in which the spectral distribution is colored or emphasized with the image processor may be generated to allow a user to perform inspection based on the image information.

The inspection method according to this embodiment is applicable to a manufacturing method for items such as food, a medicine, and cosmetics.

Specifically, a material (object) to be used for manufacturing an item can be inspected by the above-mentioned inspection method, and the item can be manufactured through use of the inspected material.

For example, when it is determined in the above-mentioned second step that the material has foreign matter or flaws, a user (manufacturer) or a manufacturing apparatus can remove the foreign matter from the material or a material having foreign matter or flaws can be discarded.

Further, the inspection method described above may be used for detection of abnormality in the manufacturing apparatus. For example, the presence or absence of abnormality may be determined based on the image information of the manufacturing apparatus. Then, in accordance with the determination result, the driving of the manufacturing apparatus may be stopped, or abnormality of the manufacturing apparatus may be corrected.

According to the present invention, a spectral information acquisition system capable of achieving sufficient light utilization efficiency can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-000620, filed Jan. 7, 2020, which is hereby incorporated by reference herein in its entirety.

What is claimed is:

1. A spectral information acquisition system comprising:
   an illumination optical system configured to illuminate an object being moved; and
   a spectral optical system configured to disperse light from the object illuminated by the illumination optical system,
   wherein the illumination optical system includes:
      a separation element configured to separate a light flux emitted from a light source into a first polarized light flux having a first polarization state and a second polarized light flux having a second polarization state; and
      a phase plate configured to change the polarization state of at least one of the first polarized light flux and the second polarized light flux, and
   wherein the first polarized light flux illuminates the object from a first direction, and the second polarized light flux illuminates the object from a second direction that is different from the first direction.

2. The spectral information acquisition system according to claim 1, wherein the phase plate is a $\lambda/2$ plate.

3. The spectral information acquisition system according to claim 1, wherein the following condition is satisfied:

$$|a \tan(\tan \theta p1/\cos \theta 1) - a \tan(\tan \theta p2/\cos \theta 2)| \leq 10°,$$

where $\theta 1$ represents an angle formed between the first direction and an optical axis of the spectral optical system, $\theta 2$ represents an angle formed between the second direction and the optical axis of the spectral optical system, $\theta p1$ represents an angle formed between a first cross section parallel to the first direction, the second direction, and the optical axis of the spectral optical system and a polarization direction of the first polarized light flux, and $\theta p2$ represents an angle formed between the first cross section and a polarization direction of the second polarized light flux.

4. The spectral information acquisition system according to claim 1, wherein the illumination optical system includes an optical-path changing element configured to change an optical path of one of the first polarized light flux and the second polarized light flux.

5. The spectral information acquisition system according to claim 1, wherein the separation element is a wire-grid polarizing element.

6. The spectral information acquisition system according to claim 1, wherein the first polarized light flux and the second polarized light flux are incident on the object from opposite sides across the optical axis of the spectral optical system.

7. The spectral information acquisition system according to claim 1,
   wherein the first direction is located within a plane including a normal line of a placement surface on which the object is to be placed and the optical axis of the spectral optical system and is located on a side opposite to the normal line of the placement surface across the optical axis of the spectral optical system, and
   wherein the following condition is satisfied:

$$\theta 4 = \theta 3; \text{ and}$$

$$\theta 5 \neq \theta 3,$$

where θ3 represents an angle formed between the normal line of the placement surface and the optical axis of the spectral optical system, θ4 represents an angle formed between the first direction and the normal line of the placement surface, and θ5 represents an angle formed between the second direction and the normal line of the placement surface.

8. The spectral information acquisition system according to claim 1, wherein the illumination optical system includes a light collecting element configured to collect a light flux emitted from the light source so as to illuminate an illumination area that is long in a reading direction perpendicular to a moving direction of the object and the optical axis of the spectral optical system.

9. The spectral information acquisition system according to claim 1,
wherein the spectral optical system consists of a front group, a light shielding member, and a rear group which are arranged in the stated order from an object side toward an image side,
wherein the light shielding member has an opening which is long in a reading direction perpendicular to a moving direction of the object and the optical axis of the spectral optical system, and
wherein the rear group includes a diffraction surface configured to disperse, in a second cross section perpendicular to the reading direction, a light flux having passed through the opening into a plurality of light fluxes having different wavelengths.

10. The spectral information acquisition system according to claim 9, wherein the front group does not form an image of the object on the opening in a third cross section parallel to the reading direction, and forms an intermediate image of the object on the opening in the second cross section.

11. The spectral information acquisition system according to claim 1, further comprising a light receiving element configured to receive a plurality of light fluxes from the spectral optical system.

12. The spectral information acquisition system according to claim 1, further comprising a controller configured to cause the object to move.

13. The spectral information acquisition system according to claim 1, further comprising:
a light receiving element configured to receive a plurality of light fluxes from the spectral optical system; and
an image processor configured to acquire spectral information of the object based on output from the light receiving element.

14. An inspection method comprising:
acquiring image information of an object by imaging the object via the spectral information acquisition system of claim 1; and
performing inspection of the object based on the image information.

15. The inspection method according to claim 14, wherein the performing inspection includes determining presence or absence of foreign matter in the object.

16. A manufacturing method comprising:
inspecting the object by the inspection method of claim 14; and
manufacturing an item with use of the object inspected by the inspecting.

17. The manufacturing method according to claim 16, wherein the manufacturing an item includes removing foreign matter in the object.

* * * * *